United States Patent
Zhong et al.

(10) Patent No.: US 11,544,571 B2
(45) Date of Patent: Jan. 3, 2023

(54) OPTIMIZING UNSUPERVISED GENERATIVE ADVERSARIAL NETWORKS VIA LATENT SPACE REGULARIZATIONS

(71) Applicant: Agora Lab, Inc., Santa Clara, CA (US)

(72) Inventors: Sheng Zhong, Santa Clara, CA (US); Shifu Zhou, Shanghai (CN)

(73) Assignee: Agora Lab, Inc., Santa Clara, CA (US)

( * ) Notice: Subject to any disclaimer, the term of this patent is extended or adjusted under 35 U.S.C. 154(b) by 605 days.

(21) Appl. No.: 16/661,982

(22) Filed: Oct. 23, 2019

(65) Prior Publication Data
US 2020/0349447 A1     Nov. 5, 2020

Related U.S. Application Data

(60) Provisional application No. 62/842,125, filed on May 2, 2019.

(51) Int. Cl.
*G06N 20/20* (2019.01)
*G06N 3/08* (2006.01)
*G06N 3/04* (2006.01)

(52) U.S. Cl.
CPC .......... *G06N 3/088* (2013.01); *G06N 3/0454* (2013.01); *G06N 3/084* (2013.01); *G06N 20/20* (2019.01)

(58) Field of Classification Search
CPC ...... G06N 3/088; G06N 3/0444; G06N 3/084; G06N 20/20; G06T 9/002
USPC ......................................................... 706/25
See application file for complete search history.

(56) References Cited

U.S. PATENT DOCUMENTS

2017/0103161 A1*  4/2017  Brubaker ............... G16B 15/00
2019/0295302 A1*  9/2019  Fu .......................... G06T 11/60

OTHER PUBLICATIONS

Hu, C., etc., Dual Encoder-Decoder based Generative Adversarial Networks for Disentangled Facial Representation Learning, Hu, C., etc., IEEE Trans. & J., vol. 4, 2016. [online], [Retrieved on Jun. 1, 2022], Retrieved from the Internet: <URL: https://arxiv.org/pdf/1909.08797.pdf > (Year: 2017).*

* cited by examiner

*Primary Examiner* — Gordon G Liu
(74) *Attorney, Agent, or Firm* — Young Basile Hanlon & MacFarlane, P.C.

(57) ABSTRACT

Training a generator G of a GAN includes generating, by G and in response to receiving a first input Z, a first output G(Z); generating, by an encoder E of the GAN and in response to receiving the first output G(Z) as input, a second output E(G(Z)); generating, by G and in response to receiving the second output E(G(Z)) as input, a third output G(E(G(Z))); generating, by E and in response to receiving the third output G(E(G(Z))) as input, a fourth output E(G(E(G(Z)))); training E to minimize a difference between the second output E(G(Z)) and the fourth output E(G(E(G(Z)))); and using the second output E(G(Z)) and fourth output E(G(E(G(Z)))) to constrain a training of the generator G. G(Z) is an ambient space representation Z. E(G(Z)) is a latent space representation of G(Z). G(E(G(Z))) is an ambient space representation of E(G(Z)). E(G(E(G(Z)))) is a latent space representation of G(E(G(Z))).

20 Claims, 7 Drawing Sheets

US 11,544,571 B2

OPTIMIZING UNSUPERVISED GENERATIVE ADVERSARIAL NETWORKS VIA LATENT SPACE REGULARIZATIONS

CROSS-REFERENCE TO RELATED APPLICATION(S)

This application claims priority to and the benefit of U.S. Provisional Application Patent Ser. No. 62/842,125, filed May 2, 2019, the entire disclosure of which is hereby incorporated by reference.

TECHNICAL FIELD

This disclosure relates generally to generative adversarial networks (GANs) and more specifically to the training of a GAN.

BACKGROUND

Machine learning relates to computers learning to perform tasks without explicit instructions. Based on sample data, a computer builds (e.g., infers) a model for performing a task. When presented with new data, the computer uses the model to perform the task. The task can be a classification task, a prediction task, an inference task, and the like.

Generative adversarial networks (GANs) are a class of machine learning systems that can be used to generate new data. For example, GANs can be used to generate new images. For example, in the field of super-resolution, GANs can be used to generate high-resolution images from low-resolution images. For example, in the field of inpainting, GANs can be used to reconstruct lost or deteriorated parts of images and/or videos. GANs can also be used in many other applications, such as for generating realistic domain-specific images (i.e., generating images that look real).

SUMMARY

A first aspect is a method of training a generator G of a Generative Adversarial Network (GAN). The method includes generating, by the generator G and in response to receiving a first input Z, a first output G(Z); generating, by an encoder E of the GAN and in response to receiving the first output G(Z) as input, a second output E(G(Z)); generating, by the generator G and in response to receiving the second output E(G(Z)) as input, a third output G(E(G(Z))); generating, by the encoder E and in response to receiving the third output G(E(G(Z))) as input, a fourth output E(G(E(G(Z)))); training the encoder E to minimize a difference between the second output E(G(Z)) and the fourth output E(G(E(G(Z)))); and using the second output E(G(Z)) and fourth output E(G(E(G(Z)))) to constrain a training of the generator G. The first output G(Z) is a first ambient space representation of the first input Z. The second output E(G(Z)) is a first latent space representation of the first output G(Z). The third output G(E(G(Z))) is a second ambient space representation of the second output E(G(Z)). The fourth output E(G(E(G(Z)))) is a second latent space representation of the third output G(E(G(Z))).

A second aspect is a system for training a generator G of Generative Adversarial Network (GAN). The system includes a processor and a memory. The processor is configured to executed instructions stored in the memory to generate, by the generator G and in response to receiving a first input Z, a first output G(Z); generate, by an encoder E of the GAN and in response to receiving the first output G(Z) as input, a second output E(G(Z)); generate, by the generator G and in response to receiving the second output E(G(Z)) as input, a third output G(E(G(Z))); generate, by the encoder E and in response to receiving the third output G(E(G(Z))) as input, a fourth output E(G(E(G(Z)))); train the encoder E to minimize a difference between the second output E(G(Z)) and the fourth output E(G(E(G(Z)))); and use the second output E(G(Z)) and fourth output E(G(E(G(Z)))) to constrain a training of the generator G. The first output G(Z) is a first ambient space representation of the first input Z. The second output E(G(Z)) is a first latent space representation of the first output G(Z). The third output G(E(G(Z))) is a second ambient space representation of the second output E(G(Z)). The fourth output E(G(E(G(Z)))) is a second latent space representation of the third output G(E(G(Z))).

A third aspect is a method for style transfer. The method includes receiving, by a generator G, an input corresponding to a source image including a first participant; and outputting, from the generator G, an output image, where the first participant is modified in the output image. The generator G is trained using a Generative Adversarial Network (GAN) by steps including generating, by the generator G and in response to receiving a first input Z, a first output G(Z); generating, by an encoder E of the GAN and in response to receiving the first output G(Z) as input, a second output E(G(Z)); generating, by the generator G and in response to receiving the second output E(G(Z)) as input, a third output G(E(G(Z))); generating, by the encoder E and in response to receiving the third output G(E(G(Z))) as input, a fourth output E(G(E(G(Z)))); training the encoder E to minimize a difference between the second output E(G(Z)) and the fourth output E(G(E(G(Z)))); and using the second output E(G(Z)) and fourth output E(G(E(G(Z)))) to constrain a training of the generator G. The first output G(Z) is a first ambient space representation of the first input Z. The second output E(G(Z)) is a first latent space representation of the first output G(Z). The third output G(E(G(Z))) is a second ambient space representation of the second output E(G(Z)). The fourth output E(G(E(G(Z)))) is a second latent space representation of the third output G(E(G(Z))).

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Deep Neural Networks (DNN) have been utilized in many areas to, inter alia, solve computer vision problems such as image recognition and image generation. Convolutional Neural Networks (CNN), in particular, have been wildly used and have achieved the state-of-the-art results in these areas.

Deep CNN models extract image features through operations such as filtering, striding, pooling and non-linear rectifying. The features become more abstract as the CNN layers get deeper. These features (referred to as latent space features) are fed to the final layers of the network to perform computer vision tasks such as object detection, image classification, image segmentation, image annotation and image generation. Many model architectures have been proposed to improve the performance such as accuracy.

Generative adversarial networks (GANs) can be used to learn the data distribution of, for example, real images. Based on the learning, new images can be generated. More specifically, a generator G of the GAN learns the distribution of real data on the underlying real data, and then attempts to generate samples that look like the real samples.

Figure 3:
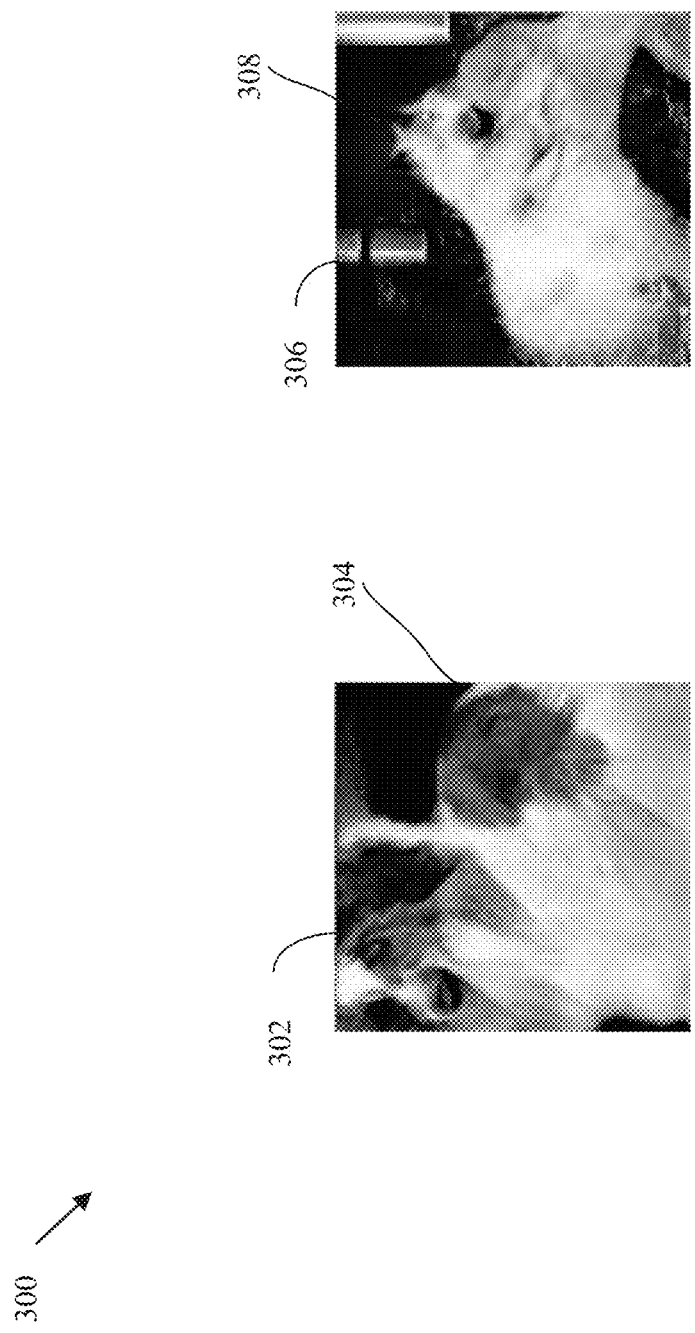
FIG. 3 is an example of problems with generated data by a GAN.

A problem with GAN networks is that generated data (e.g., generated images) may contain undesirable artefacts, such as distortions or unnatural or missing image structures, such as described with respect to FIG. 3. Such artefacts can be attributed, at least in part, to the lack of explicit latent space optimization. Deep layer latent space features of a CNN can be hard to understand and/or manipulate. The end performance of a CNN is usually the result of many trial and error experiments. Many of the experiments are designed without clear guidance on how to derive the network architectures and/or objective functions to get better results. Additionally, the improvements (e.g., the realness of generated images, the accuracy of classification, etc.) from many of such experiments are usually very limited or not ideal.

Implementations and GAN architectures according to this disclosure can be used to eliminate or at least reduce such artefacts. As such, more realistic and artefact-free data can be generated by the generator G.

Implementations and GAN architectures according to this disclosure leverage the Lipschitz continuity condition in the training of GAN architectures according to this disclosure. The Lipschitz continuity condition can be used to introduce an encoder E into a GAN architecture. The encoder introduces, into the GAN architecture, a new latent space regularization. Both the image space generator G and the latent space encoder E can be optimized simultaneously. This results in significantly improved performance.

The encoder E can be used to minimize the latent space differences between a first generated sample, $G(Z)$ and a second generated sample, $G(E(G(Z)))$ that is an ambient space representation of an encoded representation (i.e., a latent space representation) of the first generated sample $G(Z)$, as further explained below. The latent space representations of $G(Z)$ and $G(E(G(Z)))$ are denoted, respectively, $E(G(Z))$ and $E(G(E(G(Z))))$. The disclosure herein mainly applies in unsupervised learning situations. In unsupervised learning, a real data sample, $y_i$, that corresponds to a generated data $G(z_i)$ is not known. That is, the correspondence between a pair of real and generated data samples is not known and/or is not required. Said another way, when a new data $G(z_i)$ is generated, it is not known what $G(z_i)$ should look like; specifically, while $G(z_i)$ should look like some real data sample $y_i$, the real data sample $y_i$ is not known.

Throughout, a generator may be referred as G, a generator, or a generator network; a discriminator, may be referred to as D, a discriminator, or a discriminator network; and an encoder may be referred as E, an encoder, or an encoder network.

Optimizing unsupervised generative adversarial networks via latent space regularizations is described herein first with reference to a system, architecture, or environment in which the teachings can be incorporated.

Figure 1:
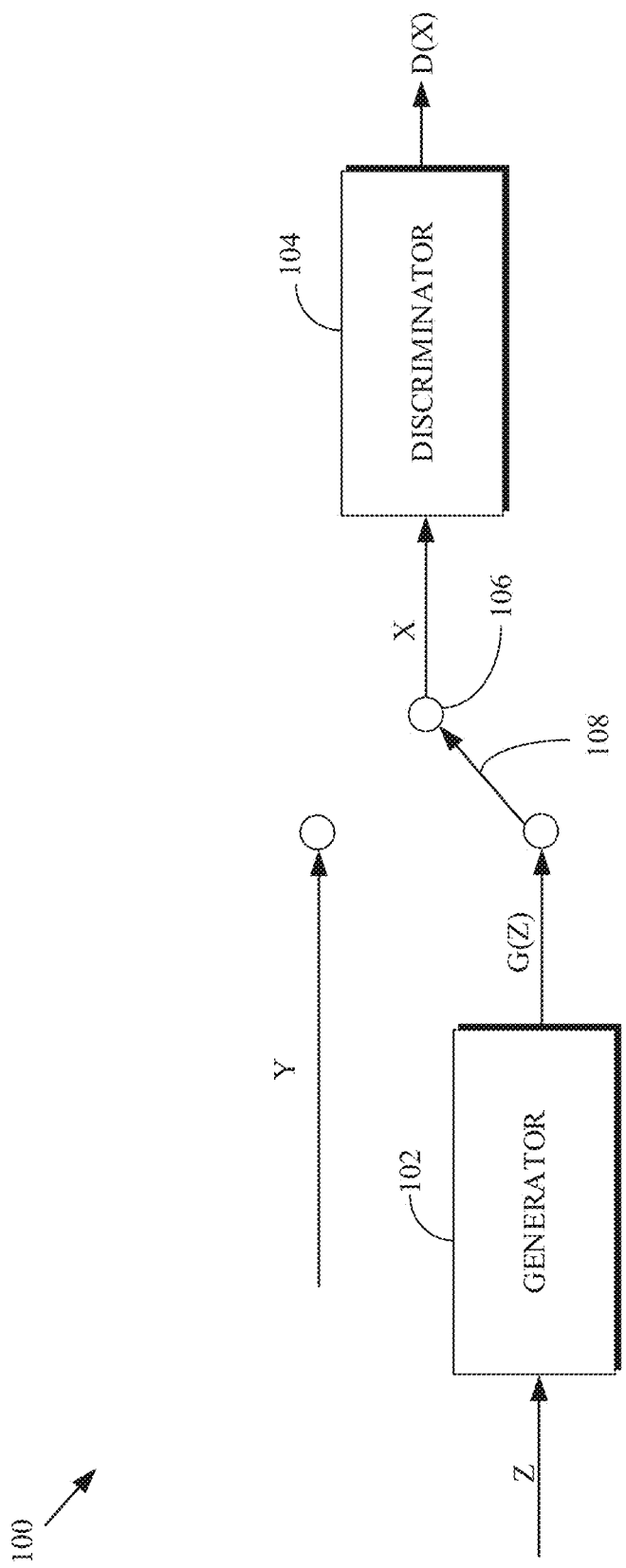
FIG. 1 is an example of a generic generative adversarial network (GAN).

FIG. 1 is an example of a generic generative adversarial network (GAN) 100. The GAN 100 includes a generator 102 and a discriminator 104. A purpose of the GAN 100 is such that, through training (i.e., after the training is complete), the generator 102 can generate realistic data (e.g., generated, realistic images of faces) such that the discriminator 104 cannot tell that the data is generated. That is, the discriminator 104 considers (i.e., is fooled into considering) the generated data to be real data.

The generator 102 can be an inverse convolutional network that receives a vector of random noise, Z, and upsamples the noise, Z, to generate the generated data (e.g., generated image), $G(Z)$. The generator 102 can be thought of as a function that maps the input Z to an output $G(Z)$. The discriminator 104 can be a convolutional network that can categorize the input that is fed to it, along an input 106, into as either real or fake (i.e., generated).

In an example, given an input X, the discriminator 104 outputs a label, $D(X)$, indicating whether the input X is real or generated. The discriminator 104 can be binomial classifier that can label (e.g., classify) an input X as real or generated. For example, $D(X)$ can be 0 if the discriminator 104 determines that the input X is generated; otherwise $D(X)$ can be 1. Other output values can be possible. In another example, $D(X)$ can be a probability value.

As illustrated by a switch 108, the discriminator 104 can receive, as an input X, either the output $G(Z)$ of the generator 102 or a real data sample Y. When the discriminator 104 receives $G(Z)$ as input (i.e., when $X=G(Z)$), the output of the discriminator 104 is a value, $D(G(Z))$, indicating whether the discriminator 104 considers the input $G(Z)$ to be real or generated. When the discriminator 104 receives Y as input (i.e., when $X=Y$), the output of the discriminator 104 is a value, $D(Y)$, indicating whether the discriminator 104 considers the input Y to be real or generated.

The generator 102 and the discriminator 104 networks can be thought of as working together and, at the same time, working against each other. Colloquially, the generator 102 can be thought of a counterfeiter and the discriminator 104 can be thought of as a cop. The counterfeiter's purpose (during the training) is to generate data such that the cop cannot recognize that the generated data are counterfeit.

The generator 102 is trained to maximize the probability $D(G(Z))$ to fool the discriminator 104 so that the discriminator 104 is not able to tell $G(Z)$ is generated. The discriminator 104 is trained to minimize the probability $D(G(Z))$ and maximize the probability $D(Y)$ so that the generated sample $G(Z)$ can be distinguished from a real data sample Y. When a real input Y is fed into the discriminator 104, the goal of the discriminator 104 is to output, for example, a probability $D(X)=1$; and to output a $D(X)=0$ if the input is generated (e.g., $G(X)$). Again, $D(X)$ can be the probability that the input X is real (i.e., P(class of input=real data)).

The end result is that when both the generator 102 and the discriminator 104 converge, the discriminator 104 can no longer distinguish the generated sample $G(Z)$ from a real data sample Y. At this point, the generator 102 can be regarded as having learned the distribution of the real data Y. By convergence is meant that additional training of either of the generator 102 and/or the discriminator 104 does lead to improved (or sufficiently improved) performance.

Backpropagation can be used to improve the performance of each of the generator 102 and the discriminator 104 networks.

As mentioned, the discriminator 104 can output a value D(x) indicating the chance that the input X is a real data sample. The objective of the discriminator 104 is to maximize the chance of recognizing real data samples (i.e., Y) as real and the chance of recognizing that generated samples (i.e., G(Z)) as fake (i.e., generated). That is, the goal of the discriminator 104 is to maximize the likelihood of the inputs. To measure the loss, cross-entropy, p log(q), can be used. The cross-entropy loss is a measure of how accurately the discriminator identified real and generated samples (e.g., images). Optimizing the weights $\theta_D$ of the discriminator 104 can be expressed by the optimization problem of equation (1):

$$\theta_D^* = \arg_{\theta_D} \max_{\theta_D} EP_y[\log D_{\theta_D}(y)] + EP_z[\log(1 - D_{\theta_D}(G_{\theta_G}(z)))] \quad (1)$$

In equation (1), $EP_y$ means the expectation value with respect to the distribution of variable Y (i.e., a real data sample), $EP_z$ means the expectation value with respect to the distribution of variable Z (i.e., the random noise from which G(Z) is generated), and $\theta_D$ and $\theta_G$ are the current network weight parameters of the discriminator 104 (D) and the generator 102 (G) respectively. $D_{\theta_D}(y)$ is the output of the discriminator 104 given the current discriminator network parameters $\theta_D$ when the input Y (i.e., a real data sample) is presented to the discriminator 104. $D_{\theta_D}(G_{\theta_G}(z))$ is the output of the discriminator 104 given the current discriminator network parameters $\theta_D$ when the input $G_{\theta_D}(z)$ (which, in turn, is the output of the generator 102 given the current generator network parameter $\theta_G$ when the input z is presented to the generator 102) is presented to the discriminator 104.

The equation (1) (i.e., the objective function of the discriminator 104) can be summarized as: find a new set of discriminator network parameters, $\theta_D^*$, that maximizes the ability of the discriminator 104 to recognize real data samples better (i.e., corresponding to the term $EP_y[\log D_{\theta_D}(y)]$) and to recognize generated data samples better (i.e., corresponding to the term $E P_z [\log (1 - D_{\theta_D}(G_{\theta_G}(z)))]$).

Training the generator 102 can also be via backpropagation. The objective function of the generator 102, as mentioned above, can be such that the generator 102 generates data (e.g., images) with the highest possible value of D(x) to fool the discriminator 104. As such, the objective function of the generator G can be given by equation (2):

$$\theta_G^* = \arg_{\theta_G} \min_{\theta_G} EP_z[\log(1 - D_{\theta_D}(G_{\theta_G}(z)))] \quad (2)$$

$EP_z$ and $D_{\theta_D}(G_{\theta_D}(z))$ are as described with respect to equation (1). Equation (2) can be summarized as: Find the optimal parameters of the generator 102, G, so that an output G(Z) of the generator 102 can fool the discriminator 104 the most.

The equations (1) and (2) can be combined into the minmax optimization problem:

$$(\theta_G^*, \theta_D^*) = \arg_{(\theta_G, \theta_D)} \min_{\theta_G} \max_{\theta_D} EP_y[\log D_{\theta_D}(y)] + E P_z[\log(1 - D_{\theta_D}(G_{\theta_G}(z)))]$$

In an example, the objective functions of equations (1) and (2) can be learned jointly, such as by alternating gradient ascent and descent of the discriminator 104 and the generator 102, respectively. For example, the parameters, $\theta_G$, of the generator 102 can be fixed and a single iteration of gradient ascent on the discriminator 104 can be performed using the real (i.e., Y) and the generated (i.e., $G_{\theta_G}(Z)$) data samples; then the parameters, $\theta_D$, of the discriminator 104 are fixed and the generator 102 can be trained for another single iteration of gradient descent. The discriminator 104 and the generator 102 networks can be trained in alternating steps until the generator 102 produces samples, G(Z), that the discriminator 104 cannot recognize as generated samples.

Figure 2:
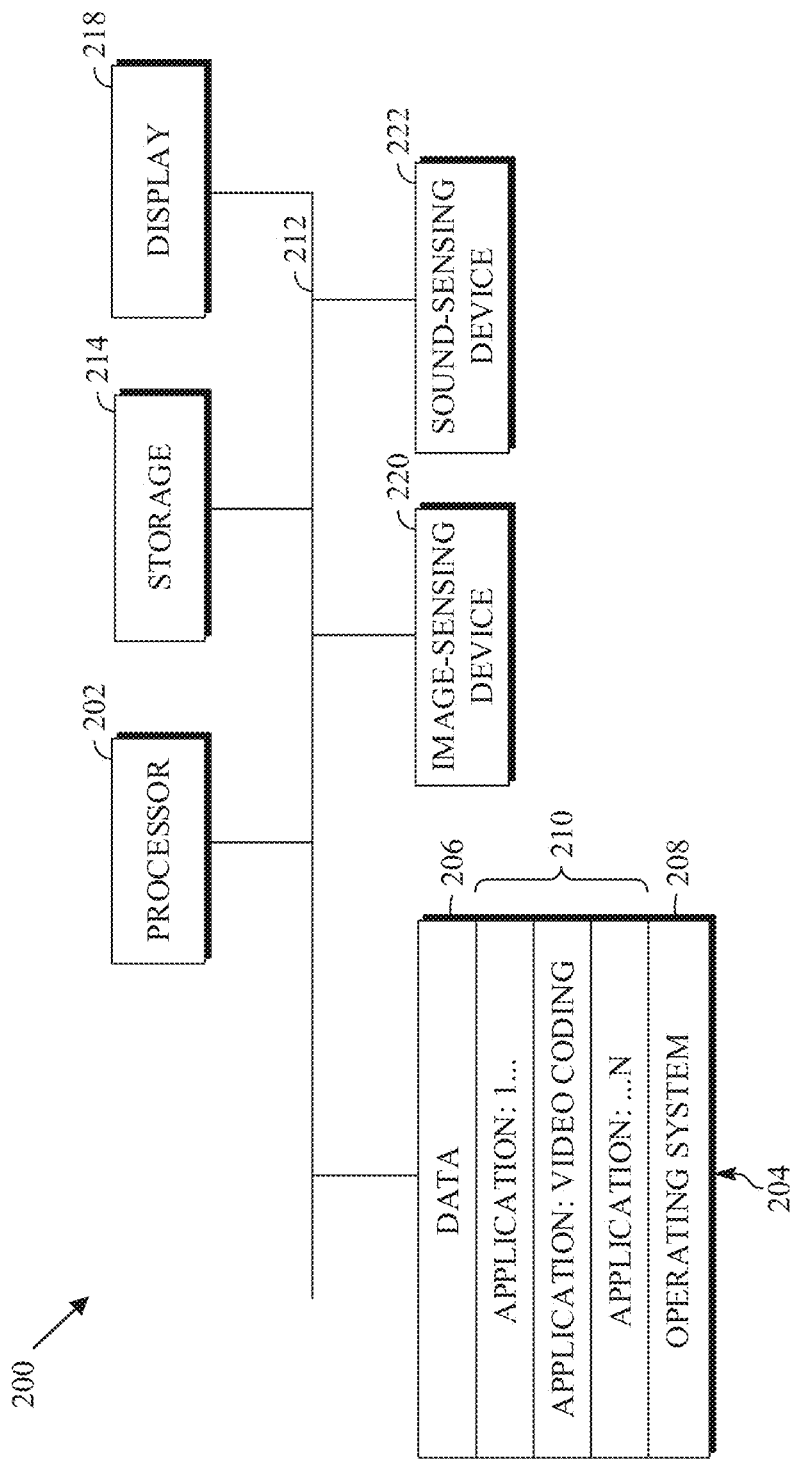
FIG. 2 is a block diagram of an example of a computing device that can implement a neural network.

FIG. 2 is a block diagram of an example of a computing device 200 that can implement a neural network. The neural network can be a convolutional neural network. For example, the computing device 200 can implement one or both of the generator 102 and the discriminator 104 of FIG. 1. The computing device 200 can implement an encoder, E, as further described below. The computing device 200 can be in the form of a computing system including multiple computing devices, or in the form of a single computing device, for example, a mobile phone, a tablet computer, a laptop computer, a notebook computer, a desktop computer, and the like.

A CPU 202 in the computing device 200 can be a central processing unit. Alternatively, the CPU 202 can be any other type of device, or multiple devices, capable of manipulating or processing information now-existing or hereafter developed. Although the disclosed implementations can be practiced with a single processor as shown, e.g., the CPU 202, advantages in speed and efficiency can be achieved using more than one processor.

A memory 204 in the computing device 200 can be a read-only memory (ROM) device or a random access memory (RAM) device in an implementation. Any other suitable type of storage device can be used as the memory 204. The memory 204 can include code and data 206 that is accessed by the CPU 202 using a bus 212. The memory 204 can further include an operating system 208 and application programs 210, the application programs 210 including at least one program that permits the CPU 202 to perform the methods described here. For example, the application programs 210 can include applications 1 through N, which further include a video coding application that performs the methods described here. The computing device 200 can also include a secondary storage 214, which can, for example, be a memory card used with a computing device 200 that is mobile. Because the video communication sessions can contain a significant amount of information, they can be stored in whole or in part in the secondary storage 214 and loaded into the memory 204 as needed for processing.

The computing device 200 can also include one or more output devices, such as a display 218. The display 218 can be, in one example, a touch sensitive display that combines a display with a touch sensitive element that is operable to sense touch inputs. The display 218 can be coupled to the CPU 202 via the bus 212. Other output devices that permit a user to program or otherwise use the computing device 200 can be provided in addition to or as an alternative to the display 218. When the output device is or includes a display, the display can be implemented in various ways, including by a liquid crystal display (LCD), a cathode-ray tube (CRT) display or light emitting diode (LED) display, such as an organic LED (OLED) display.

The computing device 200 can also include or be in communication with an image-sensing device 220, for example a camera, or any other image-sensing device 220 now existing or hereafter developed that can sense an image such as the image of a user operating the computing device 200. The image-sensing device 220 can be positioned such that it is directed toward the user operating the computing device 200. In an example, the position and optical axis of the image-sensing device 220 can be configured such that the field of vision includes an area that is directly adjacent to the display 218 and from which the display 218 is visible.

The computing device 200 can also include or be in communication with a sound-sensing device 222, for example a microphone, or any other sound-sensing device now existing or hereafter developed that can sense sounds near the computing device 200. The sound-sensing device 222 can be positioned such that it is directed toward the user operating the computing device 200 and can be configured to receive sounds, for example, speech or other utterances, made by the user while the user operates the computing device 200.

Although FIG. 2 depicts the CPU 202 and the memory 204 of the computing device 200 as being integrated into a single unit, other configurations can be utilized. The operations of the CPU 202 can be distributed across multiple machines (each machine having one or more of processors) that can be coupled directly or across a local area or other network. The memory 204 can be distributed across multiple machines such as a network-based memory or memory in multiple machines performing the operations of the computing device 200. Although depicted here as a single bus, the bus 212 of the computing device 200 can be composed of multiple buses. Further, the secondary storage 214 can be directly coupled to the other components of the computing device 200 or can be accessed via a network and can comprise a single integrated unit such as a memory card or multiple units such as multiple memory cards. The computing device 200 can thus be implemented in a wide variety of configurations.

As already mentioned, GAN models have become popular for image processing tasks, such as super resolution, image to image translation, image or video style transfer, inpainting, and other applications. However, there are some inherent problems in GAN models. Examples of such problems include mode collapse and distortion. Mode collapse refers to situations where multiple inputs map to one output when the different inputs are expected/intended to result in different outputs. For example, given a bimodal distribution of data with 2 Gaussians concentrated at two points, the GAN may learn only one of the modes. As such, regardless of the input to the generator, the output would map to the one of the Gaussian distributions that is learnt.

For example, when a generator, such as the generator 102 of FIG. 1, is applied to generate images that mimic natural images, the generated image may look unreal, distorted, and/or lack details. FIG. 3 is an example of problems 300 with generated data by a GAN. More specifically, FIG. 3 illustrates examples of generated images that are generated by a generator, such as the generator 102 of FIG. 1, wherein the generator is trained using unsupervised training. That is, during training of the generator, it is not known what the target image (i.e., the real image) is for a generated image.

FIG. 3 illustrates an image 302 and an image 306 of what are supposed to be dogs. While, upon an initial glance, the images 302, 306 may appear to be images of dogs, the images 302, 306 contain distortions and/or local parts that look unnatural or unexpected and/or contain missing parts. For example, a structure 304 of the dog in the image 302 is such an unnatural structure. For example, while a structure 308 of the dog in the image 306 may resemble a face, upon closer inspection the face appears to be incomplete. Additionally, the bodies of the dogs in the images 302, 306 appear to resemble blobs than dog bodies.

Such unnatural images may be generated, during training, by the generator of a GAN at least due in part to the fact the GAN is trained using unsupervised training. To re-iterate, in unsupervised training, there's no strict correspondence between each input Z to the generator and the expected output, Y. That is, there is no corresponding target Y (Y is described with respect to FIG. 1). The only expectation/requirement in unsupervised training is that G(Z) (i.e., the output of a generator when Z is used as input) should resemble a real data sample. For example, in the case that G(Z) is an image, G(Z) should look real.

As such, it is desirable that data (e.g., images) generated by a generator of a GAN not include artefacts, such as distortions and/or unnatural structures. Generating images with less artefacts can improve the learning performance of the GAN. That is, the more realistic the generated data, the quicker the GAN can converge to optimal solutions to equations (1) and (2).

Figure 4:
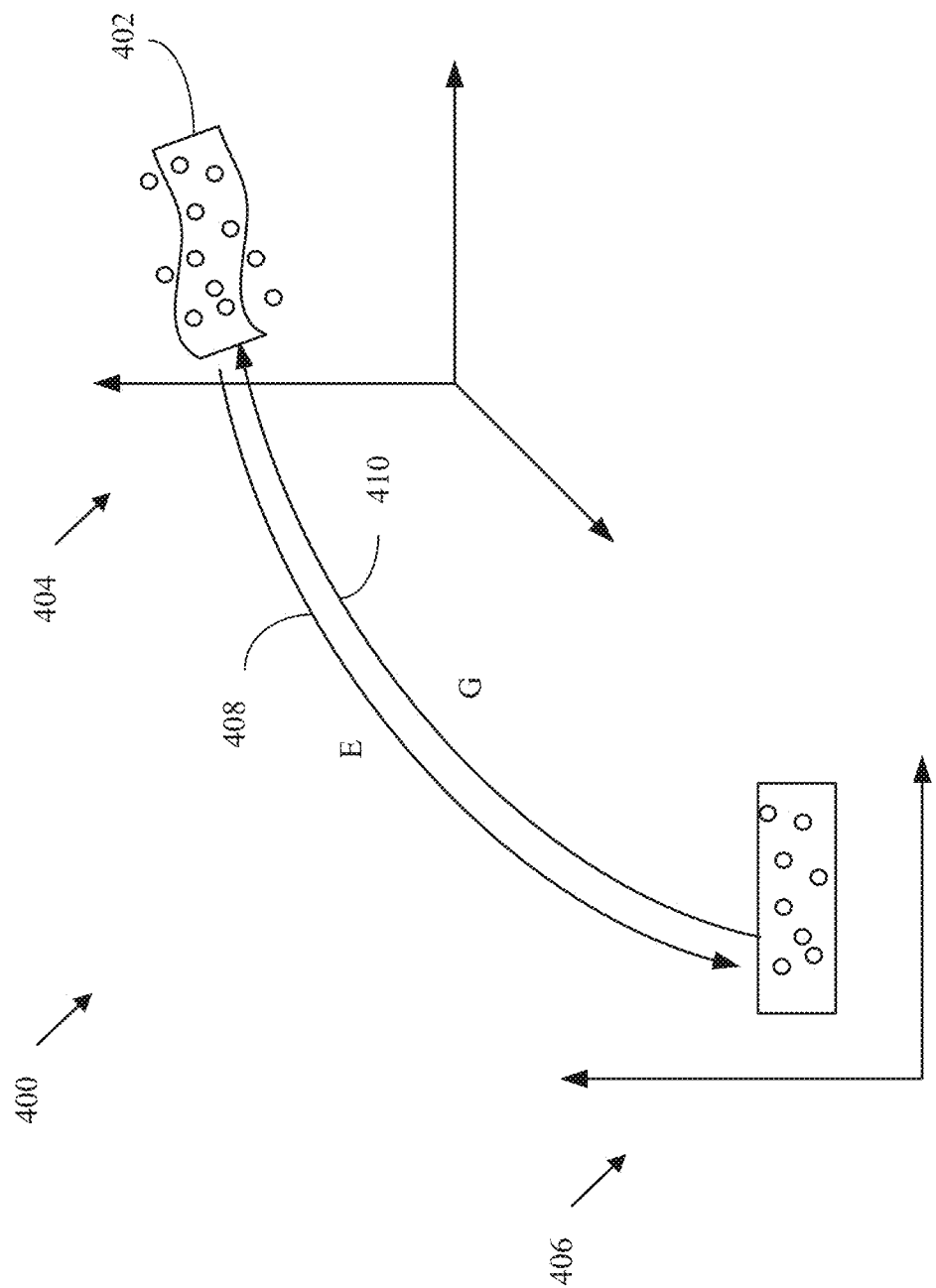
FIG. 4 is an illustration of an image manifold and a latent space of the image manifold.

Natural images can be regarded as residing in a manifold embedded in a high dimensional space (also called the ambient space). FIG. 4 is an illustration 400 of an image manifold and a latent space of the image manifold. A manifold 402 is illustrated. The manifold 402 is usually of lower dimensionality than that of the ambient space. An ambient space 404 is illustrated, for ease of visualization, as a 3-dimensional space. In general, the ambient space 404 can be thought of as being m-dimensional. For ease of visualization, the manifold 402 is illustrated as being mapped to a two-dimensional latent space, a latent space 406. However, in general, the manifold 402 can be thought of as being n-dimensional, where n≤m.

The manifold 402 can be mapped, as illustrated by an arrow 408, to the lower dimensional space (i.e., the latent space 406) via an encoding map E (i.e., an encoder E). The lower dimensional space can be called the latent space. The reverse mapping, illustrated by an arrow 410, from the latent space 406 to the ambient space 404 is the generator function G. That is, a generator, such as the generator 102 of FIG. 1, can generate a data sample in the ambient space 404. The two spaces (i.e., the ambient space 404 and the latent space 406) are homeomorphic, in mathematical terms. As such, the encoder E and the generator G are homeomorphisms. That is, the image manifold 402 can be homeomorphic between the generator and the encoder spaces. Under this homeomorphism, at least theoretically, the two spaces are equivalent. One space can be mapped to the other using the corresponding generator function or the encoding function.

Different classes of natural images reside in different neighborhoods of the manifold. It is desirable that each data sample (e.g., each image) that is generated (i.e., by a generator, such as the generator 102 of FIG. 1) be located in a close vicinity of the target neighborhood. That is, for example, it is desirable that the generated data sample G(Z) of FIG. 1 be as close as possible to the target Y of FIG. 1.

To achieve this, implementations according to this disclosure can use a new GAN architecture that imposes regularizations from the latent space. An encoder E can be combined with a GAN, such as the GAN 100 of FIG. 1. New loss functions are used to train GAN models according to this disclosure.

Latent space regularization is now explained. As explained with respect to FIG. 4, a collection of, for example, N×M-sized natural images can reside in a manifold, such as the manifold 402, embedded in an N*M dimensional space, such as the ambient space 404. If the images in the collection are effectively parameterized by a small number of continuous variables, then the collection of images will lie on or near a low dimensional manifold in this high dimensional space.

As is known, before a neural network can be used for a task (e.g., classification, regression, image reconstruction, etc.), the neural network is trained to extract features through many layers (convolutional, recurrent, pooling, etc.). The neural network becomes (e.g., learns) a function that projects (e.g., maps) the image on the latent space. In other words, the latent space is the space where the features lie. The latent space contains a compressed representation of the image. This compressed representation is then used to reconstruct an input, as faithfully as possible. To perform well, a neural network has to learn to extract the most relevant features (e.g., the most relevant latent space).

Given any two samples $z_1$ and $z_2$ in the latent space (i.e., $z_1$ and $z_2$ used as inputs to a generator, such as the generator 102 of FIG. 1), the generated samples in the ambient space are $G(z_1)$ and $G(z_2)$ (i.e., $G(z_1)$ and $G(z_2)$ are the respective outputs of the generator). The inequality (3) can be imposed on the generator function.

$$|G(z_1)-G(z_2)| \le k^* |z_1-z_2| \qquad (3)$$

The inequality (3) expresses that the absolute change (i.e., $|G(z_1)-G(z_2)|$) of the function G (i.e., the output of a generator G) can be upper bounded by a constant multiple, k, of the absolute latent space difference (i.e., $|z_1-z_2|$). The constant, k, is referred to as the Lipschitz constant. That is, the Lipschitz continuity condition is applied to the generator such that the variation of the function (i.e., the output of the generator) is upper bounded by the variation of the inputs to the generator. By applying the Lipschitz continuity condition, the variation of the pictures can be well controlled; that is, the variation of the function G can be well controlled.

Directly bounding the difference of the output of the generator (i.e., $|G(z_1)-G(z_2)|$) by the difference of the inputs (i.e., $|z_1-z_2|$) is not valid (e.g., not appropriate) because the inputs (e.g., $z_1$ and $z_2$) are usually random and/or corrupted by random noise or other impairments. As such, instead of using the constraint of inequality (3), the constraint of inequality (4) (see below) can be used by introducing, to the GAN model, an encoder (which is also referred as an encoding map, E, or an encoding network).

The additional encoding map E (i.e., an encoder E) can be used to explicitly map an input sample to its latent space. For example, if the output, G(Z), of a generator, G, were input to the encoder E, the encoder E would map G(Z) to E(G(Z)). That is, the encoder E maps the ambient space point G(Z) to the latent space point E(G(Z)). As such, the composited function E G maps the input Z to the latent space point E(G(Z)).

If the latent space point E(G(Z)), which is output from the encoder E, were itself input to the generator G, then the generator G would map the E(G(Z)) back to the ambient space G(E(G(Z))). If the ambient space point G(E(G(Z))) were itself to be input to the encoder E, then the encoding map E would map G(E(G(Z))) to the latent space point E(G(E(G(Z)))), which is the same latent space as that of Z. As such, E(G(Z)) and E(G(E(G(Z)))) are the latent space representations of G(Z) and G(E(G(Z))), respectively. According to implementations of this disclosure, the encoder E learns (i.e., is trained) to minimize the difference between E(G(E(G(Z)))) and E(G(Z)).

As mentioned above with respect to inequality (3), it is desirable to bound the ambient space differences of generated samples by the latent space differences of these samples. Then, similarly, it is desirable to bound the differences between the generated samples G(Z) and G(E(G(Z))) (i.e., $|G(Z)-G(E(G(Z)))|$ in equation (4)) by the differences in the latent space representations of the generated samples (i.e., $|E(G(Z))-E(G(E(G(Z))))|$ in inequality (4)).

As such, a Lipschitz condition as shown in the inequality (4) can be used. The Lipschitz condition can be applied to both the generator G and the encoder E, as further described below. The Lipschitz condition is expressed by the inequality (4).

$$|G(Z)-G(E(G(Z)))| \le k^* |E(G(Z))-E(G(E(G(Z))))| \qquad (4)$$

In the inequality (4), G(Z) is the output of the generator G, given the noise sample Z as input to the generator; and E(G(Z)) is the latent space point that is mapped from the ambient space by the encoder E. If the output E(G(Z)) of the encoder is used as input to the generator, then the output of the generator would be G(E(G(Z))). If the generator output G(E(G(Z))) is input to the encoder, then the encoder output would be E(G(E(G(Z)))). It is noted that the absolute differences used herein (such as $|G(Z)-G(E(G(Z)))|$, $|E(G(Z))-E(G(E(G(Z))))|$, etc.) mean the $L_1$-norms, unless otherwise stated. However, this disclosure is not so limited and, as such, another norm or other error measurements can be used. For example, the error can be the mean squared error.

A reason for using the inequality (4) instead of the inequality (3) is that Z (i.e., $z_1$ and/or $z_2$) is a random noise. Directly bounding the difference of the generator function, G, by a noise input difference is not a good idea. In unsupervised GAN training, input to the generator G is usually random noise (unlike, for example, in supervised learning where the input is usually some data contaminated by random noise or other artefacts or impairments). The difference of two random noise inputs is also random and can be large. As such, the difference cannot be used to bound the difference of the two corresponding outputs of the generator G.

As described with respect to FIG. 1, a typical GAN architecture includes only a generator and a discriminator. As such, the typical GAN architecture does not include an encoder E, as described above.

Figure 5A:
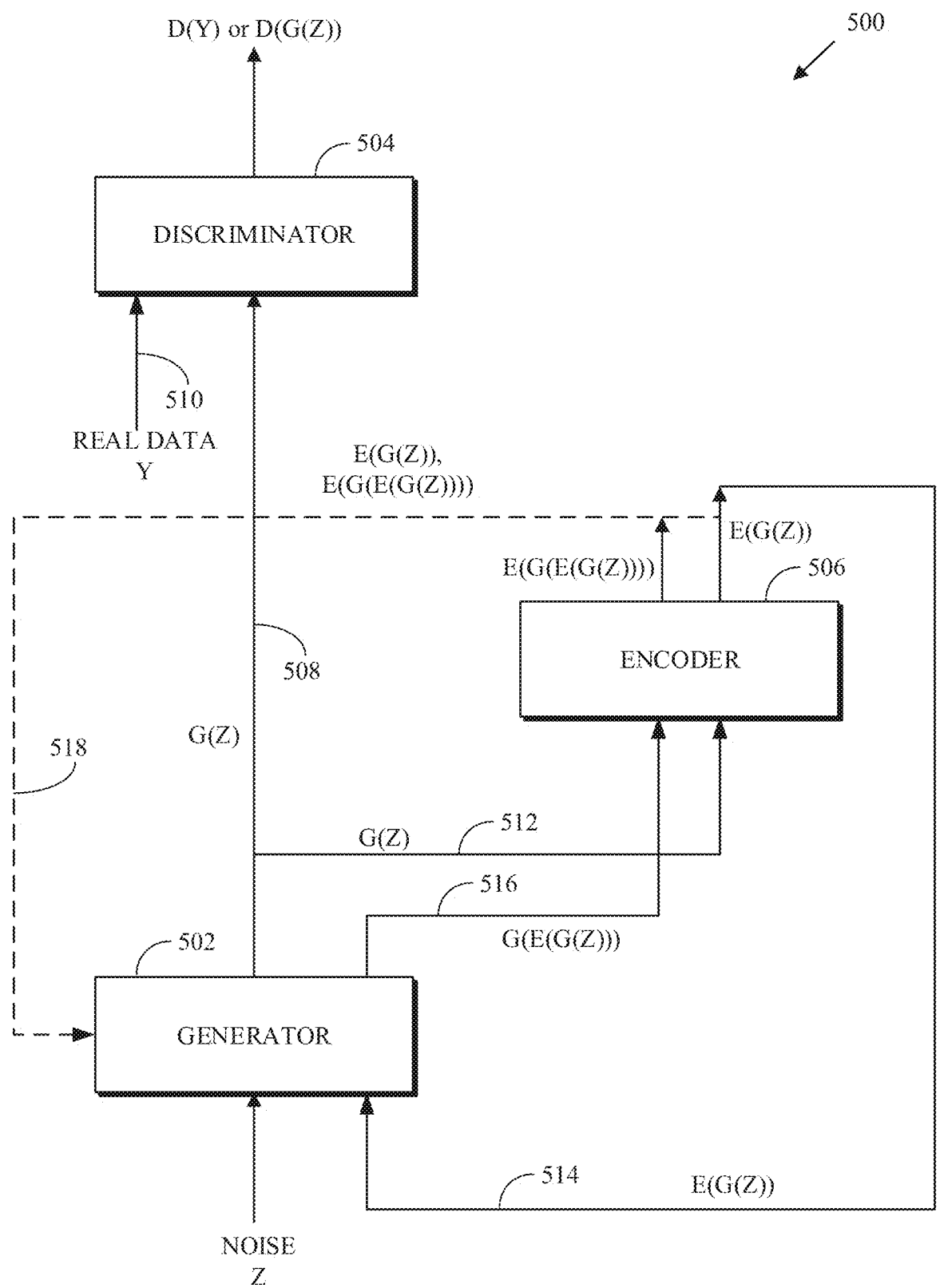
FIGS. 5A-5B are examples of GAN architectures that include an encoder according to implementations of this disclosure.

FIG. 5A is an example of a GAN architecture 500 that includes an encoder according to implementations of this disclosure. The GAN architecture 500 includes a generator 502, a discriminator 504, and an encoder 506. The generator 502 can be as described with respect to the generator 102 of FIG. 1, with the exception that the objective function of the generator 502 is different from that of the generator 102 as described herein. The discriminator 504 can be as described with respect to the discriminator 104 of FIG. 1. The encoder 506 can be a neural network, such as a convolutional neural network. For example, the encoder 506 can be adapted from the first few layers of a typical VGG model such as the VGG16, and/or followed by a few upscaling layers so that the output of the encoder 506 can match the size of noise sample Z (i.e., the input to the generator 502). VGG and VGG16 are named after the Visual Geometry Group at Oxford University and are described in Karen Simonyan, Andrew Zisserman (2015), VERY DEEP CONVOLUTIONAL NETWORKS FOR LARGE-SCALE IMAGE RECOGNITION. ICLR 2015. Retrieved from https://arxiv.org/pdf/1409.1556.pdf%20http://arxiv.org/abs/1409.1556.pdf and is incorporated herein in its entirety. The encoder 506 can be implemented by or executed by a computing device (e.g., an apparatus), such as the computing device 200 of FIG. 2. The GAN architecture 500 can be used in unsupervised training.

As described above with respect to FIG. 1, the generator 502 can receive as input an input Z and output a generated sample G(Z). The input Z can be a random value that is sampled from a distribution (such as a uniform distribution), p(z). The input Z can include multiple components. That is, the input Z can be a multi-dimensional (e.g., J-dimensional) vector of random values. Via training, the generator learns a mapping from the random noise Z to the ambient space G(Z). As such, G(Z) is the ambient space representation of the random input Z.

The discriminator 504 can receive either the generated sample G(Z) along a path 508 or receive, along a path 510, a target Y. When the discriminator 504 receives G(Z), the discriminator 504 outputs a value D(G(Z)) indicating whether the discriminator 504 determines the G(Z) to be real or generated. When the discriminator 504 receives Y, the discriminator 504 outputs a value D(Y) indicating whether the discriminator 504 determines the input Y to be real or generated.

The encoder 506 receives as input, along a path 512, the generated sample, G(Z). When the encoder 506 receives G(Z), the encoder 506 outputs a value E(G(Z)). E(G(Z)) is the latent space representation of the ambient space representation G(Z) of the noise Z.

E(G(Z)) is fed back into the generator 502, as shown by a path 514. When the generator 502 receive E(G(Z)), the generator 502 outputs G(E(G(Z))), which is the ambient space representation of latent space representation E(G(Z)). G(E(G(Z))) is fed, along a path 516, to the encoder 506, which then outputs the latent space representation E(G(E(G(Z)))).

The encoder 506 can be thought of as (1) encoding G(Z), into a usually smaller (i.e., latent) space of feature, the salient (e.g., important) features (i.e., E(G(Z))) of a generated image (i.e., G(Z)), (2) encoding into the usually smaller space of the features, a re-generated (by the generator 502) mapping (i.e., G(E(G(Z)))) of the encoding (E(G(Z))), and (3) minimizing the difference between those two encodings (i.e., E(G(Z)) and E(G(E(G(Z))))) while applying the inequality (4), which is reflected, as further described below and as illustrated by a dashed line 518, in the optimization of the of the generator 502. The difference between E(G(Z)) and E(G(E(G(Z)))) is also used to optimize (i.e., train) the encoder 506.

Accordingly, the generator 502 optimization problem of equation (2) can be reformulated (i.e., restated) as equation (5)—that is, the optimization problem of equation (2) has to satisfy the Lipschitz continuity condition with respect to the encoding map (i.e., the encoder 506).

$$\begin{cases} \theta_G^* = arg_{\theta_G} \min_{\theta_G} EP_Z[\log(1 - D_{\theta_D}(G_{\theta_G}(Z)))] \text{ subject to} \\ |G_{\theta_G}(Z) - G_{\theta_G}(E_{\theta_E}(G_{\theta_G}(Z)))| \le k * |E_{\theta_E}(G_{\theta_G}(Z)) - E_{\theta_E}(G_{\theta_G}(E_{\theta_E}(G_{\theta_G}(Z))))| \end{cases} \quad (5)$$

In equation (5), k is a constant and $\theta_G$ is the current set of weights of the generator 502 network; $\theta_E$ is the current set of weights of the encoder 506 network; and $EP_z$ represents the expectation with respect to the distribution of the noise input sample Z. $\theta_G^*$ is the new set of weights of the generator network resulting from the optimization problem of equation (5).

Mathematically, the equation (5) can be re-written as equation (6) (since a solution for the equation (5) must be a solution for the equation (6)), in which the Lipschitz constrain is added as a term to (i.e., incorporated into) the generator objective function (i.e., equation (1)):

$$\theta_G^* = \underset{\theta_G}{\arg\min}\, EP_z \begin{bmatrix} \log(1 - D_{\theta_D}(G_{\theta_G}(Z))) + \\ \mu(|G_{\theta_G}(Z) - G_{\theta_G}(E_{\theta_E}(G_{\theta_G}(Z)))| - \\ k * |E_{\theta_E}(G_{\theta_G}(Z)) - E_{\theta_E}(G_{\theta_G}(E_{\theta_E}(G_{\theta_G}(Z))))|) \end{bmatrix} \quad (6)$$

The equation (6) can be converted to equation (7) by introducing hyperparameters $\mu_1$ and $\mu_2$, where $\mu_1>0$ and $\mu_2>0$. The hyperparameter $\mu_1$ can be the same as the parameter $\mu$ of equation (6); and the hyperparameter $\mu_2$ can be equal to $\mu*k$. The hyperparameters $\mu_1$ and $\mu_2$ can be independent and can be set independently using heuristics and/or can be derived empirically.

$$\theta_G^* = \underset{\theta_G}{\arg\min}\, EP_z \begin{bmatrix} \log(1 - D_{\theta_D}(G_{\theta_G}(Z))) + \\ \mu_1 * |G_{\theta_G}(Z) - G_{\theta_G}(E_{\theta_E}(G_{\theta_G}(Z)))| - \\ \mu_2 * |E_{\theta_E}(G_{\theta_G}(Z)) - E_{\theta_E}(G_{\theta_G}(E_{\theta_E}(G_{\theta_G}(Z))))| \end{bmatrix} \quad (7)$$

As already mentioned above, the outputs E(G(Z)) and E(G(E(G(Z)))) of the encoder 506 are used by the generator 502 as part of the loss function of the generator 502, as shown in equation (7) and as illustrated by the dashed line 518. As also already mentioned, the encoder 506 is trained to minimize the absolute difference between E(G(Z)) and E(G(E(G(Z)))).

The GAN architecture 500 model can be formulated by the below equations (8)-(10). During training, the discriminator 504, the generator 502, and the encoder 506 are trained alternately. The discriminator 504 can be trained to maximize the function in (8), as in the GAN 100 of FIG. 1. The generator 502 and the encoder 506 are trained to minimize the loss functions in (9) and (10), respectively. Note that equation (8) is the same as equation (1) and equation (9) is the same as equation (7).

$$\theta_D^* = arg_{\theta_D} \max_{\theta_D} EP_y[\log D_{\theta_D}(y)] + EP_z[\log(1 - D_{\theta_D}(G_{\theta_G}(Z)))] \quad (8)$$

$$\theta_G^* = \underset{\theta_G}{\arg\min}\, EP_z \begin{bmatrix} \log(1 - D_{\theta_D}(G_{\theta_G}(Z))) + \\ \mu_1 * |G_{\theta_G}(Z) - G_{\theta_G}(E_{\theta_E}(G_{\theta_G}(Z)))| - \\ \mu_2 * |E_{\theta_E}(G_{\theta_G}(Z)) - E_{\theta_E}(G_{\theta_G}(E_{\theta_E}(G_{\theta_G}(Z))))| \end{bmatrix} \quad (9)$$

$$\theta_E^* = \underset{\theta_E}{\arg\min}\, EP_z[|E_{\theta_E}(G_{\theta_G}(Z)) - E_{\theta_E}(G_{\theta_G}(E_{\theta_E}(G_{\theta_G}(Z))))|] \quad (10)$$

Using the set of weights $\theta_E$ of the encoder 506, when G(Z) is fed (i.e., input) into the encoder 506, the encoder 506 outputs E(G(Z)). Using the same set of weights $\theta_E$, when G(E(G(Z))) is fed (i.e., input) into the encoder 506, the encoder 506 outputs E(G(E(G(Z)))). That is, the same set of weights are used for generating E(G(Z)) and E(G(E(G(Z)))). In some implementations, where parallel processors may be available, G(Z) and G(E(G(Z))) may be input into the encoder 506 to output E(G(Z)) and E(G(E(G(Z)))). G(Z) and G(E(G(Z))) are expected to look alike.

Feeding both G(Z) and G(E(G(Z))) to the encoder 506 can constitute one iteration. The weights of the encoder 506 are not updated within one iteration. The weights are updated after one or more complete iterations.

While the proposed constraints of equations (4) and (5) are described with respect to a particular generator objective function (e.g., equation (2)) and a particular discriminator objective function (e.g., equation (1)), the disclosure herein is not so limited. The constraints in equations (4) or (5) can be applicable when other forms of the discriminator function and the generator adversarial function other than the ones in equations (1) and (2) are used. For example, equation (4) can be used along with the Wasserstein distance, the Relativistic discriminator, or some other objective functions, which are used instead of equations (1) and (2). The Wasserstein distance is described in Arjovsky, M., Chintala, S. & Bottou, L. (2017). Wasserstein Generative Adversarial Networks. *Proceedings of the 34th International Conference on Machine Learning, in PMLR* 70:214-223. The Relativistic discriminator is described in Jolicoeur-Martineau, A.: The relativistic discriminator: a key element missing from standard gan. arXiv preprint arXiv:1807.00734 (2018). As can be appreciated, the equations (8)-(10) or (9)-(11) (see below) are be updated depending on the objective functions used.

The pseudocode of Table I illustrates an example of a training algorithm of GANs that include an encoder, such as the GAN architecture 500 of FIG. 5A.

TABLE I

0   Network weight parameters $\theta_D$, $\theta_E$ and $\theta_G$ are first randomly initialized.
1   For N training iterations do
2     For L steps do
3       Sample mini-batch of m noise samples $\{z_1, \ldots, z_m\}$ from noise prior $p_g(z)$ and m samples of real data $\{y_1, \ldots, y_m\}$ from the real data distribution $p_{data}(y)$.
4       Update the discriminator D by ascending its stochastic gradient:

$$\nabla_{\theta_D} \frac{1}{m} \sum_{i=1}^{m} [\log(D_{\theta_D}(y_i)) + \log(1 - D_{\theta_D}(G_{\theta_G}(z_i)))]$$

5     End for
6     Sample mini-batch of m noise samples $\{z_1, \ldots, z_m\}$ from noise prior $p_g(z)$ and m samples of real data $\{y_1, \ldots, y_m\}$ from the real data distribution $p_{data}(y)$.
7     Update the generator G by descending its stochastic gradient:

$$\nabla_{\theta_G} \frac{1}{m} \sum_{i=1}^{m} [\log(1 - D_{\theta_D}(G_{\theta_G}(z_i))) + \mu_1 * |G_{\theta_G}(z_i) - G_{\theta_G}(E_{\theta_E}(G_{\theta_G}(z_i)))| - \mu_2 * |E_{\theta_E}((G_{\theta_G}(z_i)) - E_{\theta_E}(G_{\theta_G}(E_{\theta_E}(G_{\theta_G}(z_i)))))|]$$

8     Update the encoder E by descending its stochastic gradient:

$$\nabla_{\theta_E} \frac{1}{m} \sum_{i=1}^{m} |E_{\theta_E}(G_{\theta_G}(z_i)) - E_{\theta_E}(G_{\theta_G}(E_{\theta_E}(G_{\theta_G}(z_i))))|$$

9   End For

Table I illustrates that the GAN model can be trained in N iterations. Each of the discriminator network (i.e., the discriminator 504 of FIG. 5A), the generator network (i.e., the generator 502 of FIG. 5A), and the encoder network (i.e., the encoder 506 of FIG. 5A) are trained, in that order, in one iteration. That is, one iteration involves the training of the three networks: the discriminator, the generator, and the encoder. As an initialization step (i.e., row 0 of Table I), the weights $\theta_D$, $\theta_E$ and $\theta_G$ of, respectively, the discriminator, the encoder, and the generator networks are initialized, such as to random values.

A first Loop of L steps (consisting of rows 2-5 in Table I) describes the training of the discriminator network. In some implementations, L is 1. In other implementations, L can be larger than 1. As such, the discriminator network can be optimized 1 or more times, depending on the value of L.

In each iteration, at row 3 of Table I, a mini-batch of m noisy sample $\{z_1, \ldots, z_m\}$, can be selected using the noise distribution $p_g(z)$; and a mini-batch of input real data samples $\{y_1, \ldots, y_m\}$ is also selected using the real data distribution $p_{data}(y)$. As unsupervised learning is described herein, it is not known which $z_i$ (for i=1, ..., m) corresponds to which $y_j$ (for j=1, ..., m) input sample of the selected mini-batch of input samples $\{y_1, \ldots, y_m\}$. Such a correspondence is not required to exist.

Next, at row 4 of Table I, the discriminator weights, $\theta_D$, are updated by the gradient ascent (since, as shown in equation (8), updating the discriminator weights is a maximization optimization problem). The details of gradient ascent (and descent) are not described herein as their details are known to a person skilled in the art and an understanding thereof is not necessary to the understanding of this disclosure. As is known, ascending (or descending) a stochastic gradient (as described with respect to Table I and elsewhere in this disclosure) means ascending (or descending) at least a portion of the gradient. Usually, a portion of the gradient is used for the ascending (or descending).

After the L steps of training the discriminator, the algorithm of Table I proceeds to update (i.e., update the weights of) the generator and the encoder networks. At row 6 of Table I, another mini_batch (i.e., a set) of noise samples $\{z_1, \ldots, z_m\}$ that are sampled using the noise distribution $p_g(z)$, and a mini-batch of input real data samples $\{y_1, \ldots, y_m\}$ is also selected using the real data distribution $p_{data}(y)$. Again, as unsupervised learning is described herein, it is not known which $z_i$ corresponds to which $y_j$. As mentioned above, such a correspondence is not required to exist.

At row 7 of Table I, the generator parameters, $\theta_G$, are updated using by the right hand side of equation (9). That is, the updated parameters can be obtained by descending the stochastic gradient of the right hand side of equation (9). Simultaneously, or subsequently, at row 8 of Table I, the encoder parameters, $\theta_E$, are updated by descending its gradient, which is calculated based on the right hand side equation (10).

The above described process completes one iteration of updating the respective parameters of the for discriminator, generator, and encoder networks. The process can be repeated N times, where N can be a sufficiently large enough number so that the GAN network converges. N can also be set empirically. In an example, the algorithm may not execute N times; rather the algorithm may include a termination condition that terminates the algorithm when it is determined that performance of the GAN network is no longer improving sufficiently. In an example, the discriminator can be trained after the encoder and the generator. As such, the rows 2-5 can be after the rows 6-9 in Table I.

In an example, instead of using the equation (8) to train a discriminator of a GAN, equation (11) can be used instead.

$$\theta_D^* = \arg_{\theta_D} \max_{\theta_D} EP_y[\log D_{\theta_D}(y)] + EP_z[\log(1 - D_{\theta_D}(G_{\theta_G}(z)))] + EP_z[\log(1 - D_{\theta_D}(G_{\theta_G}(E_{\theta_E}(G_{\theta_G}(z)))))] \quad (11)$$

Figure 5B:
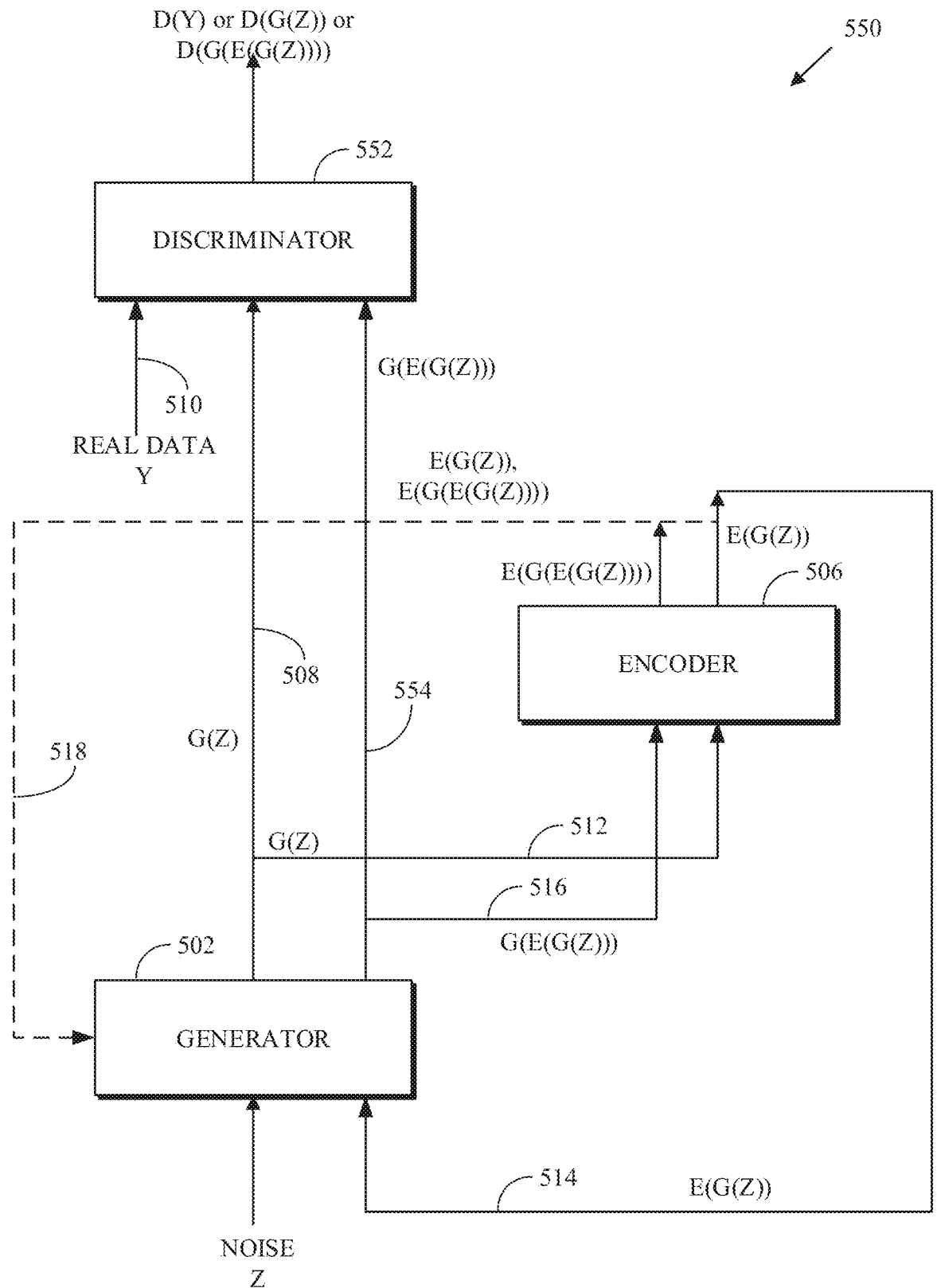

As such, the discriminator also attempts to minimize the chance that G(E(G(Z))) is real. FIG. 5B illustrates such an arrangement.

FIG. 5B is an example of a GAN architecture 550 that includes an encoder according to implementations of this disclosure. Elements of FIG. 5B having the same numerals as those of FIG. 5A can be exactly as described with respect to FIG. 5A. FIG. 5B includes a discriminator 552 that is similar to the discriminator 506 of FIG. 5A with the exception that the discriminator 506 also receives, along a path 554, the generator output G(E(G(Z))) and the discriminator 552 uses the objective function of equation (11). When the discriminator 552 receives G(E(G(Z))), the discriminator 552 outputs a value D(G(E(G(Z)))) indicating whether the discriminator 552 determines the G(E(G(Z))) to be real or generated. Accordingly, the GAN 550 can be trained using an algorithm that is as described with respect to Table I with the exception that at row 4 of Table I, the discriminator weights, $\theta_D$, can be updated by the gradient ascent $$\nabla_{\theta_D} \frac{1}{m} \sum_{i=1}^{m} [\log(D_{\theta_D}(y_i)) +$$

$$\log(1 - D_{\theta_D}(G_{\theta_G}(z_i))) + \log(1 - D_{\theta_D}(G_{\theta_G}(E_{\theta_E}(G_{\theta_G}(z_i)))))].$$

As such, the discriminator 552 can be trained to distinguish which of the G(E(G(Z))), G(Z) and Y (a real data sample) is generated and/or real data.

Figure 6:
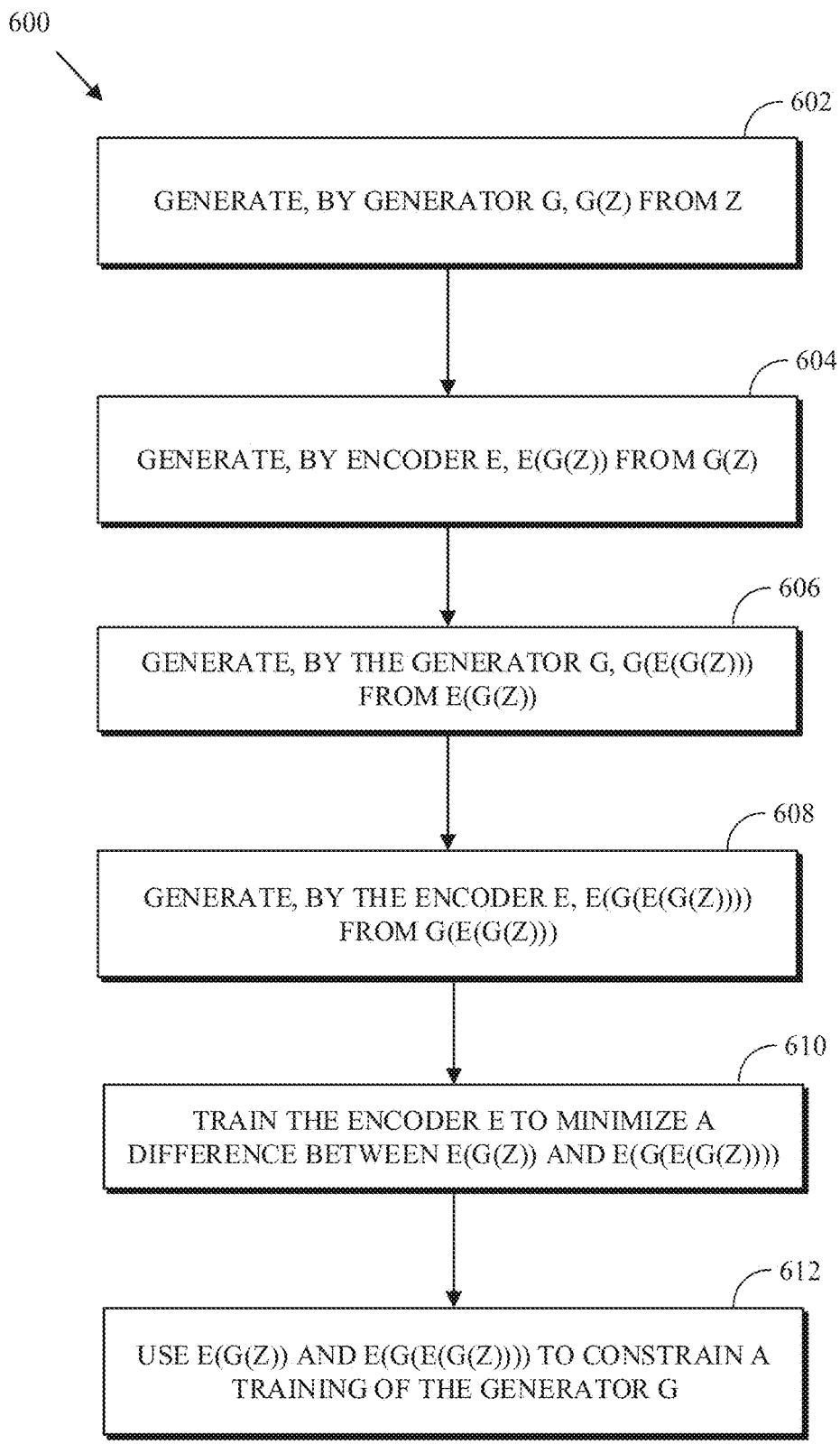
FIG. 6 is an example of a flowchart of a technique of training a Generative Adversarial Network (GAN) according to implementations of this disclosure.

FIG. 6 is an example of a flowchart of a technique 600 of training a Generative Adversarial Network (GAN) according to implementations of this disclosure. The GAN can be the GAN architecture 500 of FIG. 5A or the GAN architecture 550 of FIG. 5B. As such, the generator G can be the generator 502 of FIG. 5A or FIG. 5B; and the GAN can include a discriminator D, such as the discriminator 504 of FIG. 5A or the discriminator 552 of FIG. 5B and an encoder E, such as the encoder 506 of FIG. 5A or FIG. 5B. The technique 600 can be implemented by one or more computing devices (e.g., one or more apparatuses). An apparatus can be a computing device, such as the computing device 200 of FIG. 2. Upon completion of the technique 600, the parameters of the generator G may be stored. The parameters can be stored in a memory, such in the memory 204 of FIG. 2. The parameters of the generator G can include the networks weights of the generator G. The parameters can also include the generator network architecture, such as the number of layers, the configuration of each layer, and the like.

The technique 600 can be performed partially or fully by one or more processors, such as the CPU 202 of FIG. 2. The technique 600 can be stored as executable instructions in one or more memories, such as the memory 204 or the secondary storage 214 of FIG. 2. The one or more processors can be configured to execute the instructions stored in the one or more memories.

In an example, the generator G, the encoder E, and the discriminator D can be available on (e.g., executing on) one or more computing devices, such as the computing device 200 of FIG. 2. In an example, each of the generator G, the encoder E, and the discriminator D can be available on a separate computing device. However, that need not be the case.

To reiterate, the technique 600 can be performed by a system that includes a processor (e.g., one or more processors) and a memory (e.g., one or more memories). As such, the system can include one or more apparatuses. In an example, each of the encoder E, the generator G, and the discriminator D can be executed on or more of the apparatuses of the system. In an example, at two or more of the encoder E, the generator G, and the discriminator D can executed on one apparatus of the system. Other configurations of the system are possible.

At 602, the generator G can generate, in response to receiving a first input Z, a first output G(Z), such as described with respect to FIG. 5A. As described above, G(Z) is synthetic data that are generated by the generator G given a noise sample Z having a random distribution $p_g(z)$. The first output G(Z) constitutes a first ambient space representation of the first input Z.

At 604, the encoder E can generate a second output E(G(Z)) in response to receiving the first output G(Z) as input. As described above, E(G(Z)) is a latent space representation (i.e., a first latent space representation) of G(Z).

At 606, the generator G can generate a third output G(E(G(Z))) in response to receiving the second output E(G(Z)) as input. As described above, the third output G(E(G(Z))) is the ambient space representation of the latent space representation (i.e., E(G(Z))) of the ambient space representation (i.e., G(Z)) of the random sample Z.

At 608, the encoder E can generate a fourth output E(G(E(G(Z)))) in response to receiving the third output G(E(G(Z))) as input, as described above. The fourth output E(G(E(G(Z)))) is the latent space representation (i.e., a second latent space representation) of the ambient space representation (i.e., G(E(G(Z)))) of the latent space representation (i.e., E(G(Z))) of the ambient space representation (i.e., G(Z)) of the noise sample Z. As also described above, the discriminator D is trained to distinguish which of the G(Z) and Y (a real data sample) is generated data and which is real data.

At 610, the technique 600 can train the encoder E to minimize a difference between the latent space representations. That is, the technique 600 can train the encoder E to minimize a difference between the second output E(G(Z)) and the fourth output E(G(E(G(Z)))).

At 612, the technique 600 uses the latent space representations (i.e., the second output E(G(Z)) and the fourth output E(G(E(G(Z))))) to constrain the training of the generator G, as described above.

As described above with respect to Table I, the technique 600 can include updating the encoder E by descending, for m samples, a gradient $$\nabla_{\theta_E} \frac{1}{m} \sum_{i=1}^{m} |E_{\theta_E}((G_{\theta_G}(z_i)) - E_{\theta_E}(G_{\theta_G}(E_{\theta_E}(G_{\theta_G}(z_i)))))|.$$

Using the second output E(G(Z)) and fourth output E(G(E(G(Z)))) to constrain the training of the generator G can include using the second output E(G(Z)) and fourth output E(G(E(G(Z)))) in a loss function that is used to update weights of the generator G.

In an example, and as described above, using the second output E(G(Z)) and fourth output E(G(E(G(Z)))) to constrain the training of the generator G can include updating the generator G by descending, for m samples, a gradient $$\nabla_{\theta_G} \frac{1}{m} \sum_{i=1}^{m} [\log(1 - D_{\theta_D}(G_{\theta_G}(z_i))) + \mu_1 * |G_{\theta_G}(z_i) - G_{\theta_G}(E_{\theta_E}(G_{\theta_G}(z_i)))| -$$

$$\mu_2 * |E_{\theta_E}((G_{\theta_G}(z_i)) - E_{\theta_E}(G_{\theta_G}(E_{\theta_E}(G_{\theta_G}(z_i)))))|],$$

as described with respect to row 7 of Table I. Parameters $\mu_1$ and $\mu_2$ can be hyperparameters, as also described above.

In an example, and as described with respect to FIG. 5B, the technique 600 can include receiving by a discriminator D of the GAN, the first output G(Z) and the third output G(E(G(Z)); and updating the discriminator D by ascending a gradient $$\nabla_{\theta_D} \frac{1}{m} \sum_{i=1}^{m} [\log(D_{\theta_D}(y_i)) +$$

$$\log(1 - D_{\theta_D}(G_{\theta_G}(z_i))) + \log(1 - D_{\theta_D}(G_{\theta_G}(E_{\theta_E}(G_{\theta_G}(z_i)))))].$$

As described above, the generator G can be trained by applying a Lipschitz condition so as to upper bound a first difference between the first output G(Z) and the third output G(E(G(Z))) to a second difference between the second output E(G(Z)) and fourth output E(G(E(G(Z)))).

In an example, a discriminator D of the GAN can receive the third output G(E(G(Z))) and can output D(G(E(G(Z)))). The weights $\theta_D$ of the discriminator D can be updated by ascending a gradient $$\nabla_{\theta_D} \frac{1}{m} \sum_{i=1}^{m} [\log(D_{\theta_D}(y_i)) +$$

$$\log(1 - D_{\theta_D}(G_{\theta_G}(z_i))) + \log(1 - D_{\theta_D}(G_{\theta_G}(E_{\theta_E}(G_{\theta_G}(z_i)))))].$$

As also described above, the encoder E can be, or can include, a neural network. The network can be a VGG network. In an example, the neural network can include an upscaling layer so that each of the second output E(G(Z)) and the fourth output E(G(E(G(Z)))) of the encoder E has a first size that is equal to a second size of first input Z.

When the training is completed, the discriminator D is no longer able to distinguish a real data sample (a real image) from a generated (e.g., synthetic, generated) sample. If the discriminator is still able to distinguish real from fake, it means that the training is not optimized and the training cannot be considered completed. As already mentioned, the principle of the GAN model is that the generator tries to confuse the discriminator; and the discriminator tries to not be confused. Thus, the process is "adversarial." However, eventually, when the generator G does a good enough of a job of data generation, the discriminator D will no longer be able to tell which one is real and which first input data (e.g., a first image) is real and which second input data (e.g., a second image) is fake.

In an example, the encoder E can be or can include a VGG network. In an example, the VGG network can be adapted or can include one or more upscaling layers. The purpose of the one or more upscaling layers is so that an output of the encoder E (e.g., E(G(Z)) or E(G(E(G(Z))))) can have the same dimensionality as an input to the generator G (e.g., the random sample Z or E(G(Z))). More generally, the encoder E can be, or can include, other neural network types, such as a convolutional neural network. In other examples, the encoder E can be, or can implement, other machine learning models or techniques.

As described above, for example with respect to equations (5)-(7) and (9), the generator G can be trained by applying a Lipschitz condition so as to upper bound a first difference between the output G(Z) and G(E(G(Z))) to a second difference between the latent space representation E(G(Z)) and the latent space representation E(G(E(G(Z)))).

It is also to be noted that, typically, when the GAN network is trained, it is the generator that is subsequently used to generate data and/or to perform inferences or any other task for which the generator is trained. Typically, the encoder and the discriminator are not used for purposes other than in the training of the generator.

As mentioned, the techniques described herein can be used in unsupervised training. Unsupervised training may be used for applications such as image or video style transfer. Style transfer is the technique of recomposing images in the style of other images. For example, in video communication that includes a first participant and a second participant, the second participant may choose to let the first participant view the second participant's face as that of some celebrity. As such, the celebrity may appear to be talking and participating in the video communication instead of the second participant. Also, the second participant may choose to have sunglasses superimposed on the his/her own face; or, if the second participant is already wearing glasses, the second participant may choose to be shown without the sunglasses.

Accordingly, another aspect of the disclosed implementations is a process for style transfer. The process includes receiving, by a generator G, an input corresponding to a source image including a first participant; and outputting, from the generator G, an output image, wherein the first participant is modified in the output image. The source image can be an image that includes the second participant described above. The source image can be received at a receiving device (e.g., a mobile communications device) of the first participant. The source image can be sent from a sending device of the second participant. For example, the first participant and the second participant can be participating in a live video communication session using their respective communication devices. The output image can be a generated image that modifies the image of the second participant according to a preference of the second participant. In another example, the output image can be a generated image that modifies the image of the second participant according to a preference of the first participant.

Before being used to generate the output image during the live video communication session, the generator G can be trained as described above. For example, the generator G can be trained as described with respect to FIG. 6.

For simplicity of explanation, the technique 600 of FIG. 6 is depicted and described as a series of steps. However, steps in accordance with this disclosure can occur in various orders, concurrently, and/or iteratively. Additionally, steps in accordance with this disclosure may occur with other steps not presented and described herein. Furthermore, not all illustrated steps may be required to implement a technique in accordance with the disclosed subject matter.

The implementations herein may be described in terms of functional block components and various processing steps. The disclosed processes and sequences may be performed alone or in any combination. Functional blocks may be realized by any number of hardware and/or software components that perform the specified functions. For example, the described implementations may employ various integrated circuit components, e.g., memory elements, processing elements, logic elements, look-up tables, and the like, which may carry out a variety of functions under the control of one or more microprocessors or other control devices. Similarly, where the elements of the described implementations are implemented using software programming or software elements the disclosure may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, the implementations of the disclosure could employ any number of conventional techniques for electronics configuration, signal processing and/or control, data processing and the like.

Aspects or portions of aspects of the above disclosure can take the form of a computer program product accessible from, for example, a computer-usable or computer-readable medium. A computer-usable or computer-readable medium can be any device that can, for example, tangibly contain, store, communicate, or transport a program or data structure for use by or in connection with any processor. The medium can be, for example, an electronic, magnetic, optical, electromagnetic, or a semiconductor device. Other suitable mediums are also available. Such computer-usable or computer-readable media can be referred to as non-transitory memory or media, and may include RAM or other volatile memory or storage devices that may change over time. A memory of an apparatus described herein, unless otherwise specified, does not have to be physically contained by the apparatus, but is one that can be accessed remotely by the apparatus, and does not have to be contiguous with other memory that might be physically contained by the apparatus.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. In other words, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an aspect" or "one aspect" throughout is not intended to mean the same implementation or aspect unless described as such.

The particular aspects shown and described herein are illustrative examples of the disclosure and are not intended to otherwise limit the scope of the disclosure in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. Many alternative or additional functional relationships, physical connections or logical connections may be present in a practical device.

The use of "including" or "having" and variations thereof herein is meant to encompass the items listed thereafter and equivalents thereof as well as additional items. Unless specified or limited otherwise, the terms "mounted," "connected," 'supported," and "coupled" and variations thereof are used broadly and encompass both direct and indirect mountings, connections, supports, and couplings. Further, "connected" and "coupled" are not restricted to physical or mechanical connections or couplings.

The use of the terms "a" and "an" and "the" and similar referents in the context of describing the disclosure (especially in the context of the following claims) should be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein are performable in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed.

The above-described implementations have been described in order to allow easy understanding of the present disclosure and do not limit the present disclosure. To the contrary, the disclosure is intended to cover various modifications and equivalent arrangements included within the scope of the appended claims, which scope is to be accorded the broadest interpretation so as to encompass all such modifications and equivalent structure as is permitted under the law.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method of training a generator G of Generative Adversarial Network (GAN), comprising:
    generating, by the generator G and in response to receiving a first input Z, a first output G(Z), wherein the first output G(Z) is a first ambient space representation of the first input Z;
    generating, by an encoder E and in response to receiving the first output G(Z) as put, a second output E(G(Z)), wherein the second output E(G(Z)) is a first latent space representation of the first output G(Z), and wherein the encoder E is a separate from the generator G;
    generating, by the generator G and in response to receiving the second output E(G(Z)) as input, a third output G(E(G(Z))), wherein the third output G(E(G(Z))) is a second ambient space representation of the second output E(G(Z));
    generating, by the encoder E and in response to receiving the third output G(E(G(Z))) as input, a fourth output E(G(E(G(Z)))), wherein the fourth output E(G(E(G(Z)))) is a second latent space representation of the third output G(E(G(Z)));
    training the encoder E to minimize a difference between the second output E(G(Z)) and the fourth output E(G((G(Z)))); and
    using the second output E(G(Z)) and fourth output E(G(E(G(Z)))) to constrain a training of the generator G.

2. The method of claim 1, wherein training the encoder E to minimize the difference between the second output E(G(Z)) and the fourth output E(G(E(G(Z)))) comprising:
    updating the encoder E by descending, for m samples, a gradient $$\nabla_{\theta_E} \frac{1}{m} \sum_{i=1}^{m} |E_{\theta_E}(G_{\theta_G}(z_i)) - E_{\theta_E}(G_{\theta_G}(E_{\theta_E}(G_{\theta_G}(z_i))))|,$$

wherein the m samples comprising m random samples $\{z_1, z_2, \ldots, z_m\}$ selected from a noise prior distribution $p_g(z)$ and m target data $\{y_1, y_2, \ldots, y_m\}$ selected from a real data distribution $p_{data}(y)$, wherein $E_{\theta_E}(G_{\theta_G}(z_i))$ the second output E(G(Z)) of the encoder E given first current weight values $\theta_E$ of the encoder E and a $G_{\theta_G}(z_i)$, wherein $G_{\theta_G}(z_i)$ is the first output of the generator G in response to the generator G receiving the first input $z_i$; given second current weight values $\theta_G$ of the generator G, and wherein $E_{\theta_E}(G_{\theta_G}(E_{\theta_E}(G_{\theta_G}(z_i))))$ is the fourth output E(G(E(G(Z)))) of the encoder E given the first current weight values $\theta_E$, and the second current weight values $\theta_G$ and the first input $z_i$.

3. The method of claim 1, wherein using the second output E(G(Z)) and fourth output E(G(E(G(Z)))) to constrain the training of the generator G comprises:
using the second output E(G(Z)) and fourth output E(G(E(G(Z)))) in a loss function that is used to update weights of the generator G.

4. The method of claim 1, wherein the GAN further comprises a discriminator D, and wherein using the second output E(G(Z)) and fourth output E(G(E(G(Z)))) to constrain the training of the generator G, comprises:
updating the generator G by descending, for m samples, a gradient $$\nabla_{\theta_G} \frac{1}{m} \sum_{i=1}^{m} [\log(1 - D_{\theta_D}(G_{\theta_G}(z_i))) + \mu_1 * |G_{\theta_G}(z_i) - G_{\theta_G}(E_{\theta_E}(G_{\theta_G}(z_i)))| -$$

$$\mu_2 * |E_{\theta_E}(G_{\theta_G}(z_i)) - E_{\theta_E}(G_{\theta_G}(E_{\theta_E}(G_{\theta_G}(z_i))))|],$$

wherein $\mu_1$ and $\mu_1$ are hyperparameters,
wherein the m samples comprise m random samples $\{z_1, z_2, \ldots, z_m\}$ selected from a noise prior distribution $p_g(z)$ and m target data $\{y_1, y_2, \ldots, y_m\}$ selected from a real data distribution $P_{data}(y)$,
wherein $\theta_E$ are first current weight values of the encoder E,
wherein θG are second current weight values of the generator G,
wherein $\theta_D$ are third current weight values of the discriminator D, and
wherein $D_{\theta_D}(G_{\theta_G}(z_i))$ indicates whether the discriminator D considers the first output $G_{\theta_G(z_i)}$ to be real.

5. The method of claim 1, wherein the generator G is trained by applying a Lipschitz condition so as to upper bound a first difference between the output G(Z) and the third output G(E(G(Z))) to a second difference between the second output E(G(Z)) and fourth output E(G(E(G(Z)))).

6. The method of claim 1, further comprising:
receiving, by a discriminator D of the GAN, the first output G(Z) and the third output G(E(G(Z))); and
updating the discriminator D by ascending, for m samples, a gradient $$\nabla_{\theta_E} \frac{1}{m} \sum_{i=1}^{m} [\log(1 - D_{\theta_D}(y_i)) +$$

-continued
$$\log(1 - D_{\theta_D}(G_{\theta_G}(z_i))) + \log(1 - D_{\theta_D}(G_{\theta_G}(E_{\theta_E}(G_{\theta_G}(z_i)))))],$$

wherein the m samples comprise m random samples $\{z_1, z_2, \ldots, z_m\}$ selected from a noise prior distribution $p_g(z)$ and m target data $\{y_1, y_2, \ldots, y_m\}$ selected from a real data distribution $P_{data}(y)$,
wherein $\theta_E$ are first current weight values of the encoder E,
wherein $\theta_G$ are second current weight values of the generator G,
wherein $\theta_D$ are third current weight values of the discriminator D,
wherein $D_{\theta_D}(y_i)$ indicates whether the discriminator D considers the target datum $y_i$ to be real,
wherein $D_{\theta_D}(G_{\theta_G}(z_i))$ indicates whether the discriminator D considers the first output $D_{\theta_D}(z_{i)\text{ to be real, and}}$
wherein $D_{\theta_D} G_{\theta_G}(E_{\theta_E}(G_{\theta_G}(z_i)))$ indicates whether the discriminator D considers the third output $G_{\theta_G}(E_{\theta_E}(G_{\theta_G}(Z_i))$ to be real.

7. The method of claim 1, wherein the encoder E comprises a neural network.

8. The method of claim 7,
wherein the neural network comprises an upscaling layer, and
wherein each of the second output E(G(Z)) and the fourth output E(G(E(G(Z)))) of the encoder E having a first size equal to a second size of first input Z.

9. A system for training a generator G of Generative Adversarial Network (GAN), comprising:
a processor; and
a memory, the processor is configured to executed instructions stored in the memory to:
generate, by the generator G and in response to receiving a first input Z, a first output G(Z), wherein the first output G(Z) is a first ambient space representation of the first input Z;
generate, by an encoder E and in response to receiving the first output G(Z) as input, a second output E(G(Z)), wherein the second output E(G(Z)) is a first latent space representation of the first output G(Z), and wherein the encoder E is not part of the generator G;
generate, by the generator G and in response to receiving the second output E(G(Z)) as input, a third output G(E(G(Z))), wherein the third output G(E(G(Z))) is a second ambient space representation of the second output E(G(Z));
generate, by the encoder E and in response to receiving the third output G(E(G(Z))) as input, a fourth output E(G(E(G(Z)))), wherein the fourth output E(G(E(G(Z)))) is a second latent space representation of the third output G(E(G(Z)));
train the encoder E to minimize a difference between the second output E(G(Z)) and the fourth output E(G(E(G(Z)))); and
use the second output E(G(Z)) and fourth output E(G(E(G(Z)))) to constrain a training of the generator G.

10. The method of claim 9, wherein training the encoder E to minimize the difference between the second output E(G(Z)) and the fourth output E(G(E(G(Z)))) comprises to:
updating the encoder E by descending, for m samples, a gradient $$\nabla_{\theta_E} \frac{1}{m} \sum_{i=1}^{m} |E_{\theta_E}(G_{\theta_G}(z_i)) - E_{\theta_E}(G_{\theta_G}(E_{\theta_E}(G_{\theta_G}(z_i))))|,$$

wherein the m samples comprise m random samples $\{z_1, z_2, \ldots, z_m\}$ selected from a noise prior distribution $p_g(z)$ and m target data $\{y_1, y_2, \ldots, y_m\}$ selected from a real data distribution $P_{data}(y)$, wherein $E_{\theta_E}(G_{\theta_G}(z_i))$ is the second output E(G(Z)) of the encoder E given first current weight values $\theta_E$ of the encoder E and a $G_{\theta_G}(z_i)$, wherein $G_{\theta_G}(z_i)$ is the first output of the generator G in response to the generator G receiving the first input $z_i$; given second current weight values $\theta_G$ of the generator G, and wherein $E_{\theta_E}(G_{\theta_G}(E_{\theta_E}(G_{\theta_G}(z_i))))$ is the fourth output E(G (E(G(Z)))) of the encoder E given the first current weight values $\theta_E$, and the second current weight values $\theta_G$ and the first input $z_i$.

11. The system of claim 9, wherein to use the second output E(G(Z)) and fourth output E(G(E(G(Z)))) to constrain the training of the generator G comprises to:
use the second output E(G(Z)) and fourth output E(G(E(G(Z)))) in a loss function that is used to update weights of the generator G.

12. The system of claim 9, wherein the GAN further comprises a discriminator D, and wherein to use the second output E(G(Z)) and fourth output E(G(E(G(Z)))) to constrain the training of the generator G, comprises to:
update the generator G by descending, for m samples, a gradient $$\nabla_{\theta_G} \frac{1}{m} \sum_{i=1}^{m} [\log(1 - D_{\theta_D}(G_{\theta_G}(z_i))) + \mu_1 * |G_{\theta_G}(z_i) - (G_{\theta_G}(E_{\theta_E}(G_{\theta_G}(z_i))))| - \mu_2 * |E_{\theta_E}(G_{\theta_G}(z_i)) - E_{\theta_E}(G_{\theta_G}(E_{\theta_E}(G_{\theta_G}(z_i))))|],$$

wherein $\mu_1$ and $\mu_2$ are hyperparameters,
wherein the m samples comprise m random samples $\{z_1, z_2, z_m\}$ selected from a noise prior distribution $p_g(z)$ and m target data $\{y_1, y_2, \ldots, y_m\}$ selected from a real data distribution $P_{data}(y)$,
wherein $\theta_E$ are first current weight values of the encoder E,
wherein $\theta_G$ are second current weight values of the generator G,
wherein $\theta_D$ are third current weight values of the discriminator D, and
wherein $D_{\theta_D}(G_{\theta_G}(z_i))$ indicates whether the discriminator D considers the first output $G_{\theta_G}(z_i$ to be real.

13. The system of claim 9, wherein the generator G is trained by applying a Lipschitz condition so as to upper bound a first difference between the output G(Z) and the third output G(E(G(Z))) to a second difference between the second output E(G(Z)) and fourth output E(G(E(G(Z)))).

14. The system of claim 9, wherein the instructions further comprise instructions to:
receive, by a discriminator D of the GAN, the first output G(Z) and the third output G(E(G(Z))); and
update the discriminator D by ascending, for m samples, a gradient $$\nabla_{\theta_E} \frac{1}{m} \sum_{i=1}^{m} [\log(1 - D_{\theta_D}(y_i)) +$$

$$\log(1 - D_{\theta_D}(G_{\theta_G}(z_i))) + \log(1 - D_{\theta_D}(G_{\theta_G}(E_{\theta_E}(G_{\theta_G}(z_i)))))],$$

wherein the m samples comprise m random samples $\{z_1, z_2, z_m\}$ selected from a noise prior distribution $p_g(z)$ and m target data $\{y_1, y_2, \ldots, y_m\}$ selected from a real data distribution $P_{data}(y)$,
wherein $\theta_E$ are first current weight values of the encoder E,
wherein $\theta_G$ are second current weight values of the generator G,
wherein $\theta_D$ are third current weight values of the discriminator D,
wherein $D_{\theta_D}(y_i$ indicates whether the discriminator D considers the target datum $y_i$ be real,
wherein $D_{\theta_D}(G_{\theta_G}(z_i)$ indicates whether the discriminator D considers the first output $G_{\theta_G}(z_i)$ to be real, and
wherein $D_{\theta_D}(G_{\theta_G}(E_{\theta_E}(G_{\theta_G}(z_i))))$ indicates whether the discriminator D considers the third output $G_{\theta_G}(E_{\theta_E}(G_{\theta_G}(z_i)))$ to be real.

15. The system of claim 9, wherein the encoder E comprises a neural network.

16. The system of claim 15,
wherein the neural network comprises an upscaling layer, and
wherein each of the second output E(G(Z)) and the fourth output E(G(E(G(Z)))) of the encoder E having a first size equal to a second size of first input Z.

17. A method for style transfer, comprising:
receiving, by a generator G, an input corresponding to a source image including a first participant; and
outputting, from the generator G, an output image, wherein the first participant is modified in the output image, wherein the generator G is trained using a Generative Adversarial Network (GAN) by steps comprising:
generating, by the generator G and in response to receiving a first input Z, a first output G(Z), wherein the first output G(Z) is a first ambient space representation of the first input Z;
generating, by an encoder E and in response to receiving the first output G(Z) as input, a second output E(G(Z)), wherein the second output E(G(Z)) is a first latent space representation of the first output G(Z), and wherein the encoder E is separate from the generator G;
generating, by the generator G and in response to receiving the second output E(G(Z)) as input, a third output G(E(G(Z))), wherein the third output G(E(G(Z))) is a second ambient space representation of the second output E(G(Z));
generating, by the encoder E and in response to receiving the third output G(E(G(Z))) as input, a fourth output E(G(E(G(Z)))), wherein the fourth output E(G(E(G(Z)))) is a second latent space representation of the third output G(E(G(Z)));
training the encoder E to minimize a difference between the second output E(G(Z)) and the fourth output E(G(E(G(Z)))); and
using the second output E(G(Z)) and fourth output E(G(E(G(Z)))) to constrain a training of the generator G.

18. The method of claim 17, wherein the GAN further comprises a discriminator D, and wherein using the second output E(G(Z)) and fourth output E(G(E(G(Z)))) to constrain the training of the generator G, further comprising:

updating the generator G by descending, for m samples, a gradient $$\nabla_{\theta_E} \frac{1}{m} \sum_{i=1}^{m} \left[ \log\left(1 - D_{\theta_D}(G_{\theta_G}(z_i))\right) + \mu_1 * \left| G_{\theta_G}(z_i) - \left(G_{\theta_G}(E_{\theta_E}(G_{\theta_G}(z_i)))\right) \right| - \mu_2 * \left| E_{\theta_E}(G_{\theta_G}(z_i)) - E_{\theta_E}(G_{\theta_G}(E_{\theta_E}(G_{\theta_G}(z_i)))) \right| \right],$$

wherein $\mu_1$ and $\mu_2$ are hyperparameters, wherein the m samples comprise m random samples $\{z_1, z_2, z_m\}$ selected from a noise prior distribution $p_g(z)$ and m target data $\{y_1, y_2, \ldots, y_m\}$ selected from a real data distribution $p_{data}(y)$, wherein $\theta_E$ are first current weight values of the encoder E, wherein $\theta_G$ are second current weight values of the generator G, wherein $\theta_D$ are third current weight values of the discriminator D, and wherein $D_{\theta_D}(G_{\theta_G}(z_i))$ indicates whether the discriminator D considers the first output $G_{\theta_G}(z_i$ to be real.

19. The method of claim 18, wherein the encoder E comprises a neural network.

20. The method of claim 19, wherein the neural network comprises an upscaling layer, and wherein each of the second output E(G(Z)) and the fourth output E(G(E(G(Z)))) of the encoder E having a first size equal to a second size of first input Z.

* * * * *